US011030414B2

(12) United States Patent
Peters et al.

(10) Patent No.: US 11,030,414 B2
(45) Date of Patent: Jun. 8, 2021

(54) SYSTEM AND METHODS FOR PERFORMING NLP RELATED TASKS USING CONTEXTUALIZED WORD REPRESENTATIONS

(71) Applicant: THE ALLEN INSTITUTE FOR ARTIFICIAL INTELLIGENCE, Seattle, WA (US)

(72) Inventors: Matthew E. Peters, Seattle, WA (US); Mark Neumann, Seattle, WA (US); Mohit Iyyer, Seattle, WA (US); Matt Gardner, Seattle, WA (US); Christopher Clark, Seattle, WA (US); Kenton Lee, Seattle, WA (US); Luke Zettlemoyer, Seattle, WA (US)

(73) Assignee: The Allen Institute for Artificial Intelligence, Seattle, WA (US)

( * ) Notice: Subject to any disclaimer, the term of this patent is extended or adjusted under 35 U.S.C. 154(b) by 233 days.

(21) Appl. No.: 16/223,739

(22) Filed: Dec. 18, 2018

(65) Prior Publication Data
US 2019/0197109 A1  Jun. 27, 2019

Related U.S. Application Data

(60) Provisional application No. 62/610,447, filed on Dec. 26, 2017.

(51) Int. Cl.
*G06F 40/30* (2020.01)
*G06N 3/08* (2006.01)
*G06F 40/295* (2020.01)

(52) U.S. Cl.
CPC ............ *G06F 40/30* (2020.01); *G06F 40/295* (2020.01); *G06N 3/08* (2013.01)

(58) Field of Classification Search
CPC ..... G10L 15/16; G10L 15/063; G10L 15/197; G10L 15/18; G10L 25/30; G06F 40/30;
(Continued)

(56) References Cited

U.S. PATENT DOCUMENTS

| 5,724,487 A * | 3/1998 | Streit | G06N 3/04 706/25 |
|---|---|---|---|
| 2016/0196488 A1 * | 7/2016 | Ahn | G06N 3/049 706/41 |

(Continued)

OTHER PUBLICATIONS

Socher et al., "Recursive Deep Models for Semantic Compositionality Over a Sentiment Treebank", Proceedings of the 2013 Conference on Empirical Methods in Natural Language Processing, pp. 1631-1642, Seattle, Washington, USA, Oct. 18-21, 2013.
(Continued)

*Primary Examiner* — Huyen X Vo
(74) *Attorney, Agent, or Firm* — FisherBroyles LLP; Alan D. Minsk

(57) ABSTRACT

Systems, apparatuses, and methods for representing words or phrases, and using the representation to perform NLP and NLU tasks, where these tasks include sentiment analysis, question answering, and conference resolution. Embodiments introduce a type of deep contextualized word representation that models both complex characteristics of word use, and how these uses vary across linguistic contexts. The word vectors are learned functions of the internal states of a deep bidirectional language model (biLM), which is pretrained on a large text corpus. These representations can be added to existing task models and significantly improve the state of the art across challenging NLP problems, including question answering, textual entailment and sentiment analysis.

20 Claims, 3 Drawing Sheets

(58) Field of Classification Search
CPC ...... G06F 40/295; G06N 3/08; G06N 3/0454; G06N 3/0445; G06N 3/04
See application file for complete search history.

(56) References Cited

U.S. PATENT DOCUMENTS

| | | | | |
|---|---|---|---|---|
| 2016/0210551 | A1* | 7/2016 | Lee | G06N 3/0445 |
| 2018/0067918 | A1* | 3/2018 | Bellegarda | G06F 40/263 |
| 2018/0131645 | A1* | 5/2018 | Magliozzi | G06F 40/30 |
| 2018/0137855 | A1* | 5/2018 | Lee | G10L 15/063 |
| 2018/0329957 | A1* | 11/2018 | Frazzingaro | G06F 40/30 |

OTHER PUBLICATIONS

Søgaard et al., "Deep multi-task learning with low level tasks supervised at lower layers", Proceedings of the 54th Annual Meeting of the Association for Computational Linguistics, pp. 231-235, Berlin, Germany, Aug. 7-12, 2016.
Srivastava et al., "Dropout: A Simple Way to Prevent Neural Networks from Overfitting", The Journal of Machine Learning Research archive, vol. 15 Issue 1, pp. 1929-1958, Jan. 2014.
Srivastava et al., "Training Very Deep Networks", in NIPS '15 Proceedings of the 28th International Conference on Neural Information Processing Systems—vol. 2, pp. 2377-2385, 2015.
Turian et al., "Word representations: A simple and general method for Semi-supervised Learning", Proceedings of the 48th Annual Meeting of the Association for Computational Linguistics, pp. 384-394, Uppsala, Sweden, Jul. 11-16, 2010.
Wang et al., "Gated Self-matching Net-works for Reading Comprehension and Question Answering", in ACL, 10 pp., 2017.
Wieting et al., "Charagram: Embedding Words and Sentences Via Character n-grams", Proceedings of the 2016 Conference on Empirical Methods in Natural Language Processing (EMNLP), Austin, Texas, pp. 1504-1515, Nov. 1-5, 2016.
Wiseman et al., "Learning Global Features for Coreference Resolution", Proceedings of the 2016 Annual Conference of the North American Chapter of the Association for Computational Linguistics: Human Language Technologies (HLT-NAACL), pp. 994-1004, Jun. 2016.
Zeiler, "Adadelta: An Adaptive Learning Rate Method", CoRR abs/1212.5701, 6 pp, Dec. 2012.
Zhou et al., "End-to-end learning of semantic role labeling using recurrent neural networks", Proceedings of the 53rd Annual Meeting of the Association for Computational Linguistics and the 7th International Joint Conference on Natural Language Processing, pp. 1127-1137, Beijing, China, Jul. 26-31, 2015.
Zhou et al., "Text Classification Improved by Integrating Bidirectional LSTM with Two-dimensional Max Pooling", Proceedings of COLING 2016, the 26th International Conference on Computational Linguistics: Technical Papers, pp. 3485-3495, Osaka, Japan, Dec. 11-17, 2016.
Ba et al., "Layer normalization", CoRR abs/1607.06450, Published in ArXiv, Jul. 2016.
Belinkov et al., "What do Neural Machine Translation Models Learn about Morphology?", Proceedings of the 55th Annual Meeting of the Association for Computational Linguistics (vol. 1: Long Papers), Vancouver, Canada, pp. 861-872, Jul. 30-Aug. 4, 2017.
Bojanowski et al., "Enriching Word Vectors with Subword Information", Transactions of the Association for Computational Linguistics, vol. 5, pp. 135-146, 2017, Published Jun. 2017.
Bowman et al., "A Large Annotated Corpus for Learning Natural Language Inference", in Proceedings of the 2015 Conference on Empirical Methods in Natural Language Processing (EMNLP), Association for Computational Linguistics, Lisbon, Portugal, Sep. 2015.
Chelba et al., "One Billion Word Benchmark for Measuring Progress in Statistical Language Modeling", in INTERSPEECH, 2014, 15th Annual Conference of the International Speech Communication Association, Singapore, Sep. 14-18, 2014.

Chen et al., "Enhanced LSTM for Natural Language Inference", Proceedings of the 55th Annual Meeting of the Association for Computational Linguistics, Vancouver, Canada, pp. 1657-1668, Jul. 30-Aug. 4, 2017.
Chiu et al., "Named Entity Recognition with Bidirectional LSTM-CNNs", Transactions of the Association for Computational Linguistics, vol. 4, pp. 357-370, 2016.
Cho et al., "On the properties of neural machine translation: Encoder-decoder approaches", Proceedings of SSST-8, Eighth Workshop on Syntax, Semantics and Structure in Statistical Translation, pp. 103-111, Doha, Qatar, Oct. 25, 2014.
Clark et al., "Simple and Effective Multi-Paragraph Reading Comprehension", Proceedings of the 56th Annual Meeting of the Association for Computational Linguistics (Long Papers), pp. 845-855, Melbourne, Australia, Jul. 15-20, 2018.
Clark et al., "Deep Reinforcement Learning for Mention-Ranking Coreference Models", Proceedings of the 2016 Conference on Empirical Methods in Natural Language Processing, pp. 2256-2262, Austin, Texas, Nov. 1-5, 2016.
Collobert et al., "Natural Language Processing (Almost) from Scratch", Journal of Machine Learning Research 12 (2011) 2493-2537, Published Aug. 2011.
Dai et al., "Semi-supervised Sequence Learning", Advances in neural information processing systems, pp. 3079-3087, Nov. 2015.
Durrett et al., "Easy Victories and Uphill Battles in Coreference Resolution", Proceedings of the 2013 Conference on Empirical Methods in Natural Language Processing, pp. 1971-1982, Seattle, Washington, USA, Oct. 18-21, 2013.
Gal et al., "A Theoretically Grounded Application of Dropout in Recurrent Neural Networks", 30th Conference on Neural Information Processing Systems (NIPS 2016), Barcelona, Spain, 2016.
Gong et al., "Natural language inference over interaction space", 15 pages, Published as a conference paper at ICLR 2018.
Hashimoto et al., "A Joint Many-Task Model: Growing a Neural Network for Multiple NLP Tasks", Proceedings of the 2017 Conference on Empirical Methods in Natural Language Processing, pp. 1923-1933, Copenhagen, Denmark, Sep. 7-11, 2017.
He et al., "Deep Semantic Role Labeling: What Works and What's Next", Proceedings of the 55th Annual Meeting of the Association for Computational Linguistics, pp. 473-483, Vancouver, Canada, Jul. 30-Aug. 4, 2017.
Hochreiter et al., "Long Short-term Memory", Neural Computation, vol. 9, Issue 8, Nov. 15, 1997, pp. 1735-1780, 1997.
Iacobacci et al., "Embeddings for Word Sense Disambiguation: An Evaluation Study", Proceedings of the 54th Annual Meeting of the Association for Computational Linguistics, pp. 897-907, Berlin, Germany, Aug. 7-12, 2016.
Jozefowicz et al., "Exploring the Limits of Language Modeling", CoRR abs/1602.02410, Feb. 2016.
Jozefowicz et al., "An Empirical Exploration of Recurrent Network Architectures", ICML '15 Proceedings of the 32nd International Conference on International Conference on Machine Learning—vol. 37, pp. 2342-2350, Lille, France, Jul. 6-11, 2015.
Kim et al., "Character-aware neural language models", Proceeding AAAI '16 Proceedings of the Thirtieth AAAI Conference on Artificial Intelligence, pp. 2741-2749, Phoenix, Arizona, Feb. 12-17, 2016.
Kingma et al., "Adam: A Method for Stochastic Optimization", Contribution to International Conference on Learning Representations, San Diego, 13 pages, May 7-9, 2015.
Kumar et al., "Ask Me Anything: Dynamic Memory Networks for Natural Language Processing", Proceedings of the 33rd International Conference on Machine Learning, New York, NY, USA, JMLR 48:1378-1387, 2016.
Lafferty et al., "Conditional Random Fields: Probabilistic Models for Segmenting and Labeling Sequence Data", Proceedings of the 18th International Conference on Machine Learning 2001 (ICML 2001), pp. 282-289, Jun. 28, 2001.
Lample et al., "Neural Architectures for Named Entity Recognition", Proceedings of NAACL-HLT 2016, pp. 260-270, San Diego, California, Jun. 12-17, 2016.

(56) References Cited

OTHER PUBLICATIONS

Lee et al., "End-to-end Neural Coreference Resolution", Proceedings of the 2017 Conference on Empirical Methods in Natural Language Processing, pp. 188-197, Copenhagen, Denmark, Sep. 7-11, 2017.
Ling et al., "Finding Function in Form: Compositional Character Models for Open Vocabulary Word Representation", in Proceedings of the 2015 Conference on Empirical Methods in Natural Language Processing, pp. 1520-1530, Lisbon, Portugal, Sep. 17-21, 2015.
Liu et al., "Stochastic Answer Networks for Machine Reading Comprehension", Proceedings of the 56th Annual Meeting of the Association for Computational Linguistics (Long Papers), pp. 1694-1704, Melbourne, Australia, Jul. 15-20, 2018.
Ma et al., "End-to-end Sequence Labeling via Bi-directional LSTM-CNNs-CRF", Proceedings of the 54th Annual Meeting of the Association for Computational Linguistics, pp. 1064-1074, Berlin, Germany, Aug. 7-12, 2016.
Marcus et al., "Building a Large Annotated Corpus of English: The Penn Treebank", Computational Linguistics—Special issue on using large corpora: II archive, pp. 313-330, vol. 19 Issue 2, Jun. 1993.
McCann et al., "Learned in Translation: Contextualized Word Vectors", 31st Conference on Neural Information Processing Systems (NIPS 2017), Long Beach, CA, USA, pp. 6294-6305, 2017.
Melamud et la., "context2vec: Learning Generic Context Embedding with Bidirectional LSTM", Proceedings of the 20th SIGNLL Conference on Computational Natural Language Learning (CoNLL), pp. 51-61, Berlin, Germany, Aug. 7-12, 2016.
Melis et al., "On the state of the art of evaluation in neural language models", CoRR abs/1707.05589, 2017.
Merity et al, "Regularizing and Optimizing LSTM Language Models", arXiv preprint arXiv:1708.02182, Aug. 7, 2017.
Mikolov et al., "Distributed Representations of Words and Phrases and their Compositionality", Proceeding NIPS'13 Proceedings of the 26th International Conference on Neural Information Processing Systems—vol. 2 pp. 3111-3119, Lake Tahoe, Nevada, Dec. 5-10, 2013.
Miller et la., "Using a semantic concordance for sense identification",Proceeding HLT '94 Proceedings of the workshop on Human Language Technology pp. 240-243, Plainsboro, NJ, Mar. 8-11, 1994.
Munkhdalai et al., "Neural Tree Indexers for Text Understanding", Proceedings of the 15th Conference of the European Chapter of the Association for Computational Linguistics: vol. 1, Long Papers, pp. 11-21, Valencia, Spain, Apr. 3-7, 2017.
Neelakantan et al., "Efficient Non-parametric Estimation of Multiple Embeddings per Word in Vector Space", Proceedings of the 2014 Conference on Empirical Methods in Natural Language Processing (EMNLP), Doha, Qatar, Oct. 25-29, 2014.
Palmer et al., "The Proposition Bank: An Annotated Corpus of Semantic Roles", Computational Linguistics 31:71-106, Mar. 2005.
Pennington et al., "Glove: Global vectors for word representation", Proceedings of the 2014 Conference on Empirical Methods in Natural Language Processing (EMNLP), pp. 1532.1543, Doha, Qatar, Oct. 25-29, 2014.
Peters et al., "Semi-supervised Sequence Tagging with Bidirectional Language Models", Proceedings of the 55th Annual Meeting of the Association for Computational Linguistics, pp. 1756-1765, Vancouver, Canada, Jul. 30-Aug. 4, 2017.
Pradhan et al., "Towards Robust Linguistic Analysis Using OntoNotes", Proceedings of the Seventeenth Conference on Computational Natural Language Learning, pp. 143-152, Sofia, Bulgaria, Aug. 8-9, 2013.
Pradhan et al., "CoNLL-2012 Shared Task: Modeling Multilingual Unrestricted Coreference in OntoNotes", Proceedings of the Joint Conference on EMNLP and CoNLL: Shared Task, pp. 1-40, Jeju Island, Korea, Jul. 13, 2012.
Raganato et al., "Neural Sequence Learning Models for Word Sense Disambiguation", Proceedings of the 2017 Conference on Empirical Methods in Natural Language Processing, pp. 1156-1167, Copenhagen, Denmark, Sep. 7-11, 2017.
Raganato et al., "Word Sense Disambiguation: A Unified Evaluation Framework and Empirical Comparison", Proceedings of the 15th Conference of the European Chapter of the Association for Computational Linguistics: vol. 1, Long Papers, pp. 99-110, Valencia, Spain, Apr. 3-7, 2017.
Rajpurkar et al., "SQuAD: 100,000+ Questions for Machine Comprehension of Text", Proceedings of the 2016 Conference on Empirical Methods in Natural Language Processing, pp. 2383-2392, Austin, Texas, Nov. 1-5, 2016.
Ramachandran et al, "Unsupervised Pretraining for Sequence to Sequence Learning", Proceedings of the 2017 Conference on Empirical Methods in Natural Language Processing, pp. 383-391, Copenhagen, Denmark, Sep. 7-11, 2017.
Sang et al., "Introduction to the CoNLL-2003 Shared Task: Language-Independent Named Entity Recognition", CONLL 03 Proceedings of the seventh conference on Natural language learning at HLT-NAACL 2003—vol. 4 pp. 142-147, Edmonton, Canada, Jun. 2003.
Seo et al., "Bidirectional Attention Flow for Machine Comprehension", International Conference on Learning Representations (ICLR) 2017, vol. abs/1611.01603, Jun. 2018.

\* cited by examiner

SYSTEM AND METHODS FOR PERFORMING NLP RELATED TASKS USING CONTEXTUALIZED WORD REPRESENTATIONS

CROSS REFERENCE TO RELATED APPLICATION

This application claims the benefit of U.S. Provisional Application No. 62/610,447, entitled "System and Methods for Performing NLP Related Tasks Using Contextualized Word Representations," filed Dec. 26, 2017, which is incorporated herein by reference in its entirety (including the Appendix containing the article entitled "Deep contextualized word representations" and Supplemental Material) for all purposes.

BACKGROUND

Natural Language Processing (NLP) and Natural Language Understanding (NLU) involves may tasks, including sentiment analysis, question answering, and conference resolution. In order to perform these tasks, words and phrases are represented as word vectors or as combinations of word vectors. These vectors are used as inputs to train a recurrent neural network (RNN). The trained network is then used as part of performing an NLP or NLU task using different inputs.

However, it can be challenging to develop high quality representations of words and phrases to train a neural network and to produce useful results. This is because to be most useful, the representations should ideally model both (1) complex characteristics of word use (e.g., syntax and semantics), and (2) how these uses vary across linguistic contexts (i.e., to model polysemy). Unfortunately, conventional approaches to generating word representations are unable to effectively produce representations having these capabilities.

Embodiments of the invention are directed toward solving these and other problems or disadvantages with conventional approaches to representing words and phrases for training neural networks to perform NLP and NLU tasks, both individually and collectively.

SUMMARY

The terms "embodiments of the invention", "invention," "the invention," "the inventive" and "the present invention" as used herein are intended to refer broadly to all the subject matter described in this document and to the claims. Statements containing these terms should be understood not to limit the subject matter described herein or to limit the meaning or scope of the claims. The embodiments described herein are defined by the claims and not by this summary. This summary is a high-level overview of various aspects of the embodiments and introduces some of the concepts that are further described in the Detailed Description section below. This summary is not intended to identify key, required or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments described herein are directed to systems, apparatuses, and methods for representing words or phrases, and using the representation to perform NLP and NLU tasks, where these tasks include sentiment analysis, question answering, and conference resolution. The embodiments introduce a type of deep contextualized word representation that models both (1) complex characteristics of word use (e.g., syntax and semantics), and (2) how these uses vary across linguistic contexts (i.e., to model polysemy). The word vectors are learned functions of the internal states of a deep bidirectional language model (biLM or BiLM), which is pre-trained on a large text corpus. These representations can be added to existing models and significantly improve the state of the art across challenging NLP problems, including question answering, textual entailment and sentiment analysis. As realized by the inventors and as confirmed by their analysis, exposing the deep internal layers of the pre-trained network is an important aspect of implementing the embodiments, as it allows downstream models to mix different types of semi-supervision signals.

In one embodiment, the disclosure is directed to a method for improving the performance of a neural network used for a natural language understanding (NLU) or a natural language processing (NLP) task, where the method includes:
representing a natural language sequence or sequences with a bidirectional language model;
implementing the bidirectional language model in a neural network;
training the neural network in which the language model is implemented using a corpus of text;
identifying representations of the bidirectional language model in one or more layers of the trained neural network;
forming an expression based on the identified representations; and
inserting the formed expression into a layer of the neural network used for the natural language understanding (NLU) or natural language processing (NLP) task.

In another embodiment, the disclosure is directed to one or more non-transitory computer-readable media comprising a set of computer-executable instructions that when executed by one or more programmed electronic processors, cause the processors to improve the performance of a neural network used for a natural language understanding (NLU) or a natural language processing (NLP) task by:
representing a natural language sequence or sequences with a bidirectional language model;
implementing the bidirectional language model in a neural network;
training the neural network in which the language model is implemented using a corpus of text;
identifying representations of the bidirectional language model in one or more layers of the trained neural network;
forming an expression based on the identified representations; and
inserting the formed expression into a layer of the neural network used for the natural language understanding (NLU) or natural language processing (NLP) task.

In yet another embodiment, the disclosure is directed to a system for improving the performance of a neural network used for a natural language understanding (NLU) or a natural language processing (NLP) task, where the system includes:
an electronic processor;
a non-transitory data storage element coupled to the processor and including a set of computer-executable instructions that, when executed by the electronic processor, cause the system to
represent a natural language sequence or sequences as a bidirectional language model;

implement the bidirectional language model in the form of a neural network;

train the neural network in which the language model is implemented using a corpus of text;

identify representations of the bidirectional language model in one or more layers of the trained neural network; and form an expression based on the identified representations, wherein the formed expression further comprises one or more factors that are determined by the neural network used for the natural language understanding (NLU) or natural language processing (NLP) task.

Other objects and advantages will be apparent to one of ordinary skill in the art upon review of the detailed description of the embodiments described herein and the included figures.

BRIEF DESCRIPTION OF THE DRAWINGS

Embodiments in accordance with the present disclosure will be described with reference to the drawings, in which.

Note that the same numbers are used throughout the disclosure and figures to reference like components and features.

DETAILED DESCRIPTION

Figure 1:
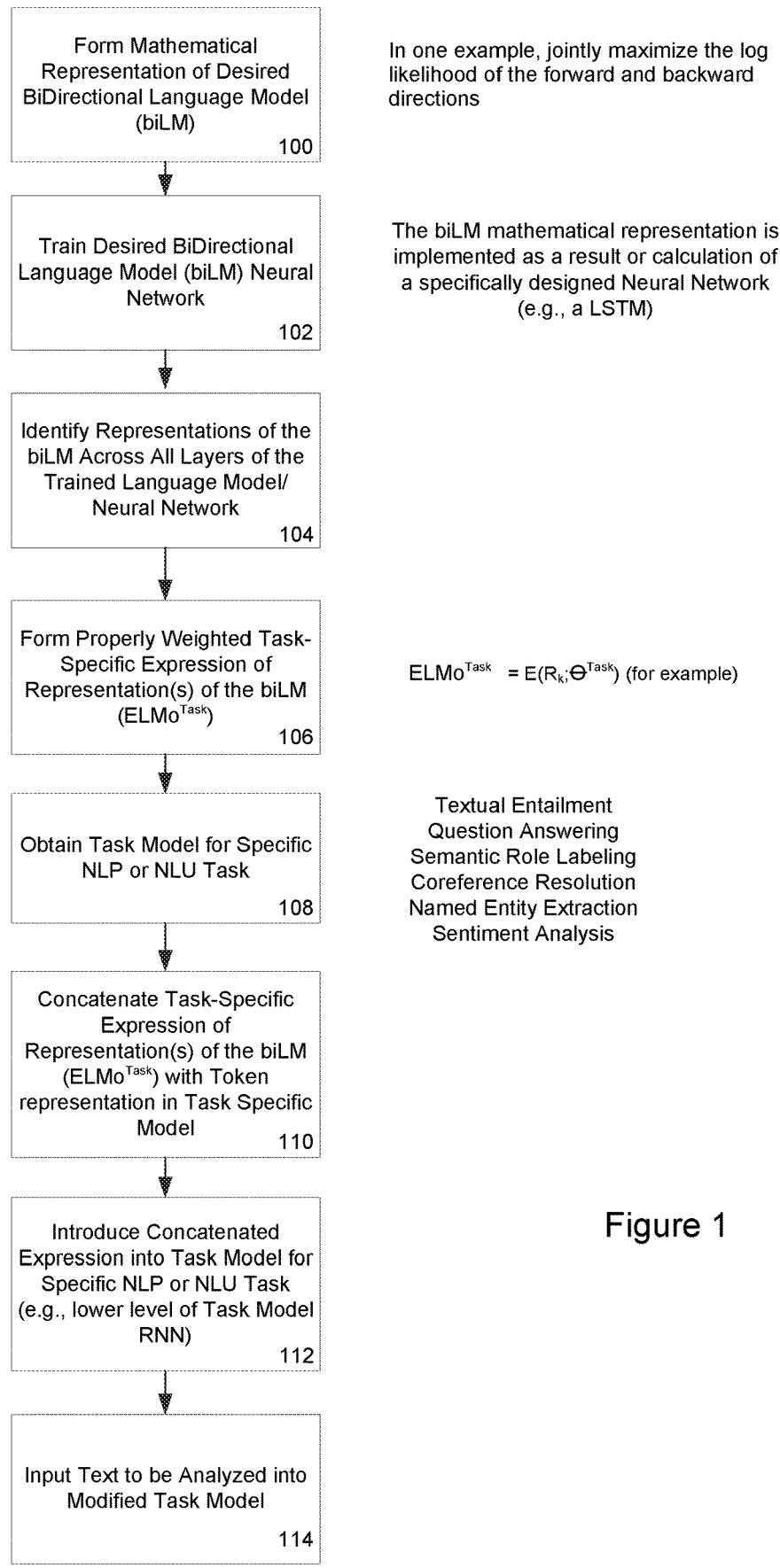
FIG. 1 is a flowchart or flow diagram illustrating a method, process, operation or function for training a bidirectional language model (biLM) and using the trained model to modify a neural network that is intended to be used for a specific NLP or NLU task.

The subject matter of embodiments is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the invention may be practiced. The invention may, however, be embodied in many different forms and should not be construed as limited to the embodiments set forth herein; rather, these embodiments are provided so that this disclosure will satisfy the statutory requirements and convey the scope of the invention to those skilled in the art. Accordingly, embodiments are not limited to the embodiments described herein or depicted in the drawings, and various embodiments and modifications can be made without departing from the scope of the claims presented.

Among other things, the present invention may be embodied in whole or in part as a system, as one or more methods, or as one or more devices. Embodiments of the invention may take the form of a hardware-implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, controller, etc.) that is part of a client device, server, network element, or other form of computing or data processing device/platform. The processing element or elements are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array (PGA or FPGA), application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

In some embodiments, one or more of the operations, functions, processes, or methods described herein (such as for the language model) may be implemented in whole or in part by the development or training of a neural network, the application of a machine learning technique or techniques, or the development or implementation of an appropriate decision process. Typically, such a network is implemented by the execution of a set of computer-executable instructions, where the instructions may be stored in (or on) a non-transitory computer-readable medium and executed by a programmed processor or processing element. Note that a neural network or deep learning model may be represented as a set of layers, with each layer composed of nodes of "neurons" and with connections between nodes in the same or different layers. The set of layers operate on an input to provide a decision (such as a classification) as an output.

A neural network is a system of interconnected artificial "neurons" that exchange messages between each other. The connections between neurons (which form the nodes in a network) have numeric weights that are tuned during a training process, so that a properly trained network will respond correctly when presented with an image or pattern to recognize (for example). The network consists of multiple layers of feature-detecting "neurons", including an input later, an output layer, and typically one or more hidden layers. Each neuron may perform a specific set of operations on its inputs, such as forming a linear or non-linear combination of inputs and weights, and then subjecting the result to a non-linear activation function to produce an output.

Each layer has many neurons that respond to different combinations of inputs from the previous layers. Training of a network is performed using a "labeled" or annotated dataset of inputs in an assortment of representative input patterns that are associated with their intended output response. Training uses optimization methods to iteratively determine the weights for intermediate and final feature neurons. In terms of a computational model, in some embodiments, each neuron calculates the dot product of inputs and weights, adds a bias, and applies a non-linear trigger function (for example, using a sigmoid response function)

FIG. 1 is a flowchart or flow diagram illustrating a method, process, operation or function for training a bidirectional language model (biLM) and using the trained model to modify a neural network that is intended to be used for a specific NLP or NLU task. As shown in the figure, an implementation of an embodiment of the system and methods described herein includes the training of a bi-directional language model (biLM), which is a form of neural network (step or stage 102). For purposes of some embodiments, a bi-directional Language Model (biLM) was selected to have the following form (as suggested by stage or step 100):

$$\sum_{k=1}^{N} \left( \log p(t_k \mid t_1, \ldots, t_{k-1}; \Theta_x, \overrightarrow{\Theta_{LSTM}}, \Theta_s) + \log p(t_k \mid t_{k-1}, \ldots, t_N; \Theta_x, \overleftarrow{\Theta_{LSTM}}, \Theta_s) \right)$$

This form combines both a forward[1] and backward[2] language model, with the formulation jointly maximizing the log likelihood of the forward and backward directions.

[1] Given a sequence of N tokens, $(t_1, t_2, \ldots, t_N)$, a forward language model computes the probability of the sequence by modeling the probability of token $t_K$ given the history $(t_1, \ldots, t_N)$:

$$p(t_1, t_2, \ldots, t_N) = \prod_{k=1}^{N} p(t_k \mid t_1, t_2, \ldots, t_{k-1})$$

$$p(t_1, t_2, \ldots, t_N) = \prod_{k=1}^{N} p(t_k \mid t_{k+1}, t_{k+2}, \ldots, t_N)$$

Further, this formulation of a language model ties (i.e., depends upon or interconnects) the parameters for both the token representation ($\Theta_x$) and Softmax layer ($\Theta_s$) in the forward and backward directions while maintaining separate parameters for the LSTMs (Long Short-Term Memory network, a type of Recurrent Neural Network) in each direction, The chosen language model also shares some weights between directions instead of using completely independent parameters. The reason for choosing some of these characteristics is discussed in greater detail in the following.

[2] A backward LM is similar to a forward LM, except it runs over the sequence in reverse, predicting the previous token given the future context:

The selected model is represented by a neural network that is designed to implement or represent the model (as suggested by stage or step 102), and is trained using a sufficiently large corpus of unlabeled text (words, phrases, etc.). The resulting trained neural network (in typical cases, a Long Short-Term Memory network) includes a set of layers, with each layer including nodes that are connected to nodes in another layer by a weighted connection. The weights are "learned" or set as a result of the training process.

Note that other forms of biLM are possible depending upon computational requirements or constraints, the specific task for which the language model will be used, or the neural network architecture being used (such as a convolutional neural network (CNN) being used instead of a LSTM neural network architecture). For example, the following forms for a biLM might also (or instead) be used:

1. Separate forward and backward directions—in the language model described herein, the inventors chose to combine the two directions to minimize model complexity and improve computational efficiency;
2. A biLM with greater or fewer layers—the inventors' experiments indicated that two layers (as in the model described herein) performs extremely well as a language model and in the downstream tasks;
3. A biLM with a larger or smaller dimension—the inventors chose the sizes to balance overall model computational requirements and expressiveness (as discussed in Section 3 of the article entitled "Deep Contextualized Word Representations" and the Supplemental Material, authored by the inventors of the present application and contained in the Appendix to the provisional patent application from which the current application claims priority); or
4. A different neural architecture, e.g. a convolutional network—as biLSTMs were (and still are) state of the art for language modeling, they were used for implementing embodiments of the system and methods described herein.

As noted, separate parameters were used in the biLM for the LSTMs; this was done because the LSTM encodes sequential context into a single vector—this is similar to how a person would read a sentence. Due to the left-to-right structure of English, the inventors reasoned that the knowledge necessary to make sense of left-to-right words might be different from the knowledge necessary to make sense of right-to-left words. In addition, weights were shared between layers because the character representation weights and SoftMax weights are not direction specific; thus by sharing them, the model shares representational power between directions. This approach is also more computationally efficient.

In general, when deciding upon the language model to use in a specific situation or for performing a specific task, the following factors are typically considered:

1. desired or required accuracy vs. execution speed; and
2. the nature of the specific task—NLU tasks that require making only a single prediction for a given sentence (e.g., sentiment classification makes one prediction (positive/negative) for each review) may only require one direction in the LM. However, NLU tasks that require making predictions for each word (e.g., co-reference resolution) would be expected to benefit from including both directions in the LM.

Once the bidirectional language model (biLM) is trained, this results in establishing or "setting" the internal weights between nodes in the network. The resulting layers of the LSTM consist of nodes and paths between those nodes and nodes in different layers, where the paths have weights or values corresponding to the neural network's response to the training inputs. Thus, after training, the nodes and connection weights represent the learned influence of the context of a word on its meaning or its use in a NLP or NLU task.

Next, the process identifies representations of the biLM across all layers of the trained neural network (e.g., the LSTM), as suggested by step or stage 104. Once these representations are identified or otherwise determined, a task-specific expression of these layers is formed (identified as $ELMo^{Task}$, as suggested by stage or step 106). The task specific expression may be a weighted combination of the layers, for example. In general, the approach described herein enables or facilitates a task model determining its own combination for each task by choosing $ELMo^{Task}$ to be a neural network.

In one embodiment, the task-specific combination of the intermediate layer representations in the biLM is based on the following process. For each token $t_k$, a L-layer biLM computes a set of 2L+1 representations $$R_\kappa = \{X_\kappa^{LM}, \vec{h}_{\kappa,j}^{LM}, \overleftarrow{h}_{\kappa,j}^{LM} | j=1, \ldots, L\} = \{h_{\kappa,j}^{LM} | j=0, \ldots, L\},$$

where $h_{\kappa,0}^{LM}$ is the token layer and $h_{\kappa,j}^{LM} = [\vec{h}_{\kappa,j}^{LM}; \overleftarrow{h}_{\kappa,j}^{LM}]$, for each biLSTM layer.

In one embodiment, for inclusion in a downstream model (such as a task specific model), the process collapses all layers in R into a single vector, termed ELMo (for Embeddings from Language Models), where $ELMo_\kappa = E(R_\kappa; \Theta_e)$. In the simplest case, ELMo selects just the top layer, $E(Rk) = h_{\kappa,L}^{LM}$.

Across the tasks considered (such as textual entailment, question answering, etc.), the inventors found that the best performance was achieved by weighting all biLM layers with softmax-normalized learned scalar weights, $s = Sj(Task) = Softmax(w)$:

$$ELMo_k^{Task} = E(R_k; w; \Upsilon) = \Upsilon \sum_{i=0}^{n} s_j h_{\kappa,j}^{LM} \text{ where } (s_j = S_j^{Task}).$$

The scalar parameter $\gamma = \gamma^{Task}$ allows the task model to scale the entire ELMo vector and is of practical importance to the optimization process. Considering that the activations of each biLM layer have a different distribution, in some cases it may also help to apply layer normalization to each biLM layer before weighting.

Note that $ELMo_k$ includes some parameters that are learned as part of the downstream model (e.g., γ (gamma) and ω). As a result, the downstream model can choose to concentrate on the biLM layers most suitable for its end goal. Empirically, the inventors found that different models do choose different weights. A possible reason for this behavior is that it is very general: it allows a task model to focus its attention on whatever parts of the biLM are most useful, without requiring the user of the system to make a (very likely) sub-optimal choice.

Next, a task model for a specific NLP or NLU task is obtained (as suggested by step or stage 108, and as an example, a RNN). The task specific model may be a form of neural network that is used for a task such as Textual Entailment, Question Answering, Semantic Role Labeling, Coreference Resolution, Named Entity Extraction, or Sentiment Analysis, for example. Next, the weighted task-specific expression is introduced into the neural network that has been designed to perform the specific NLP/NLU task.

In one embodiment, this is accomplished by concatenating $ELMo_k^{Task}$ with the token representation $X_k^{LM}$ in the task model (as suggested by step or stage 110). (Note that in some situations it may be desirable to concatenate ELMo with a different layer, or with something other than the token representation. This possibility is explored in some of the results presented in the technical article that was included in the Appendix filed with the provisional patent application upon which the present application is based.) Next, the concatenated expression is introduced into the task model, for example in the lower level (typically the token level) of the model (as suggested by step or stage 112).

The input text to be analyzed is then provided to the modified task model (as suggested by step or stage 114). The output of the task model uses the information from the ELMo representation(s) to perform a more accurate evaluation of the input task, and an evaluation that takes into account the contextual information from the trained LSTM. Note that the task for which the task model neural network is designed is the same as the task used to define the task-specific expression for ELMo referred to previously.

Figure 2:
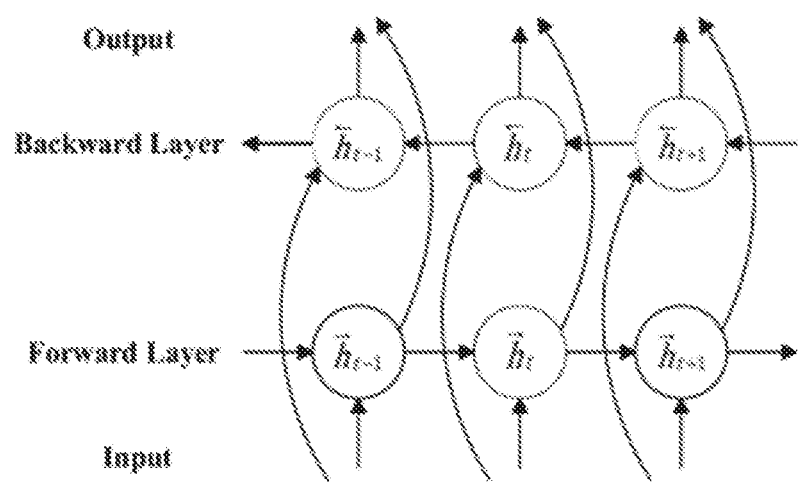
FIG. 2 is a diagram illustrating an example of a bidirectional recurrent neural network (RNN) that may be used in performing a specific NLP or NLU task.

FIG. 2 is a diagram illustrating an example of a bidirectional recurrent neural network (biRNN) that may be used as a task model in performing a specific NLP or NLU task. As shown in the figure, such a bi-directional neural network includes two types of layers, a forward layer or layers 202 and a backward layer or layers 204. The forward layers 202 may be interconnected to each other, as are the backward layers interconnected to each other.

The input to the network (bottom of the figure) is passed into a RNN cell. The forward layer accepts the first input and uses its learned parameters to compute an internal representation of the input (h->t-1). It then reads the second input and uses it along with the representation from the first input to update its representation of the entire sequence so far (h->t). This is then combined with the third input to form a representation of the sentence up to the third word (h->t+1). This process is repeated until the end of the sentence. Simultaneously, the backward RNN performs the same calculations over the sequence in reverse.

In general, a neural network is formulated mathematically, which includes defining the loss function to be optimized (the joint maximization of the log likelihood of the forward and backward directions in the case of the biLM, or the task specific learning objective in the case of other NLU tasks such as question answering, sentiment classification, etc.). The set of mathematical equations are expressed as computer code (which is executed by a suitably programmed CPU, GPU, or other processing element) and an optimization method is selected to minimize the loss as a function of the network's parameters. Note that in the case of the biLM, the inventors used Adagrad as the optimization method. The "training" of the network refers to minimizing the loss function by adjusting the network's parameters. Note that further details regarding the implementation of the neural network are described in the article entitled "Deep contextualized word representations" and the Supplemental Material, which was part of the Appendix to the previously filed provisional patent application from which the present application derives priority (e.g., sections 3, 4, and the Supplemental Material in the article).

Figure 3:
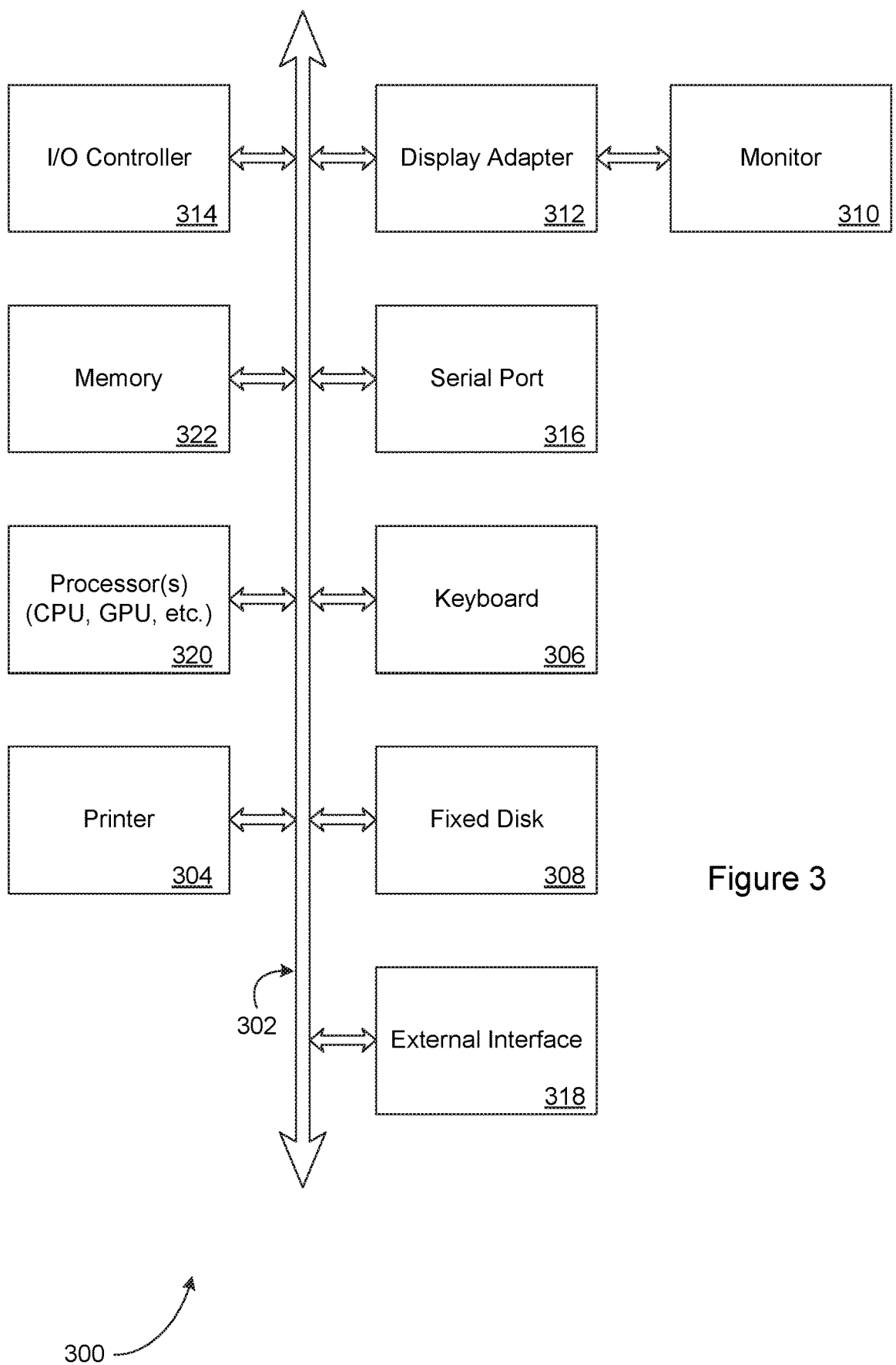
FIG. 3 is a diagram illustrating elements or components that may be present in a computer device or system configured to implement a method, process, function, or operation in accordance with an embodiment of the invention.

FIG. 3 is a diagram illustrating elements or components that may be present in a computer device or system configured to implement a method, process, function, or operation in accordance with an embodiment of the invention. As noted, in some embodiments, the system and methods described herein may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the system and methods described herein, such as for:

Defining (implementing) a desired language model (LM);
Defining a cost function;
Defining an optimization method;
Defining a method to compute the network output given suitably formatted input;
Defining a method to read textual data and convert it to a form usable by (i.e., capable of being input to) the network (typically, this is a function that converts strings to non-negative integers though the use of a vocabulary that assigns each word or character a unique integer identifier);
Defining a method to save the trained network parameters to disk for re-use;
Defining a method or process to identify the resulting layers in the trained neural network representing the language model (LM);
Defining a method or process to form a desired combination of the identified layers; or
Defining a method or process to form a concatenation of the desired combination with a layer in a task specific model or neural network (or another method or process to introduce the representation of the language model into a task model).

In some embodiments, an implementation of the system and methods described herein may include the following steps, stages, operations, processes, functional capabilities, etc.:

Form token representation, $X_k$;
Input tokens (from training corpus) into L-layer LSTM based neural network that implements the language model (biLM);
Train the LSTM;
Identify layers of the resulting trained LSTM, and find representation(s) of the biLM;
Form a task-specific linear combination of the identified layers;
Obtain a desired task model (for a specific purpose, such as textual entailment, question answering, semantic role labeling, co-reference resolution, named entity extraction, or text classification);
Concatenate a task-specific linear combination of layer weights with the token representation used in the task model (or otherwise introduce the representation(s) of the biLM into the task model);
Insert the concatenated result into task model;
Input text to be analyzed as part of the task; and
Use the output of the task model for the prescribed purpose.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the system, apparatus, methods, processes, functions, and/or operations for implementing an embodiment of the invention may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 3 is a diagram illustrating elements or components that may be present in a computer device or system 300 configured to implement a method, process, function, or operation in accordance with an embodiment of the invention. The subsystems shown in FIG. 3 are interconnected via a system bus 302. Additional subsystems include a printer 304, a keyboard 306, a fixed disk 308, and a monitor 310, which is coupled to a display adapter 312. Peripherals and input/output (I/O) devices, which couple to an I/O controller 314, can be connected to the computer system by any number of means known in the art, such as a serial port 316. For example, the serial port 316 or an external interface 318 can be utilized to connect the computer device 300 to further devices and/or systems not shown in FIG. 3 including a wide area network such as the Internet, a mouse input device, and/or a scanner. The interconnection via the system bus 302 allows one or more processors 320 (e.g., CPU, GPU, controller, or some combination) to communicate with each subsystem and to control the execution of instructions that may be stored in a system memory 322 and/or the fixed disk 308, as well as the exchange of information between subsystems. The system memory 322 and/or the fixed disk 308 may embody a tangible computer-readable medium.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus, and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the invention.

That which is claimed is:

1. A method for improving the performance of a neural network used for a natural language understanding (NLU) or a natural language processing (NLP) task, comprising:
    representing a natural language sequence or sequences with a bidirectional language model;
    implementing the bidirectional language model in a neural network;
    training the neural network in which the language model is implemented using a corpus of text;
    identifying representations of the bidirectional language model in one or more layers of the trained neural network;
    forming an expression based on the identified representations; and
    inserting the formed expression into a layer of the neural network used for the natural language understanding (NLU) or natural language processing (NLP) task.

2. The method of claim 1, wherein the natural language understanding (NLU) or natural language processing (NLP) task is one of textual entailment, question answering, semantic role labeling, co-reference resolution, named entity extraction, or text classification.

3. The method of claim 1, wherein the formed expression further comprises one or more factors that are determined by the neural network used for the natural language understanding (NLU) or natural language processing (NLP) task.

4. The method of claim 1, wherein the bidirectional language model includes a forward and a backward language model, with the formulation of the language model jointly maximizing the log likelihood of the forward and backward directions.

5. The method of claim 4, wherein the bidirectional language model shares one or more weights between directions instead of using independent parameters.

6. The method of claim 1, wherein the neural network in which the bidirectional language model is implemented is a long short-term memory (LSTM) neural network.

7. The method of claim 3, wherein the formed expression comprises a single vector.

8. The method of claim 1, wherein inserting the formed expression into a layer of the neural network used for the natural language understanding (NLU or natural language processing (NLP) task further comprises concatenating the formed expression with a token representation in the neural network used for the natural language understanding (NLU) or natural language processing (NLP) task.

9. One or more non-transitory computer-readable media comprising a set of computer-executable instructions that when executed by one or more programmed electronic processors, cause the processors to improve the performance of a neural network used for a natural language understanding (NLU) or a natural language processing (NLP) task by:
   representing a natural language sequence or sequences with a bidirectional language model;
   implementing the bidirectional language model in a neural network;
   training the neural network in which the language model is implemented using a corpus of text;
   identifying representations of the bidirectional language model in one or more layers of the trained neural network;
   forming an expression based on the identified representations; and
   inserting the formed expression into a layer of the neural network used for the natural language understanding (NLU) or natural language processing (NLP) task.

10. The one or more non-transitory computer-readable media of claim 9, wherein the natural language understanding (NLU) or natural language processing (NLP) task is one of textual entailment, question answering, semantic role labeling, co-reference resolution, named entity extraction, or text classification.

11. The one or more non-transitory computer-readable media of claim 9, wherein the bidirectional language model includes a forward and a backward language model, with the formulation of the language model jointly maximizing the log likelihood of the forward and backward directions.

12. The one or more non-transitory computer-readable media of claim 11, wherein the bidirectional language model shares one or more weights between directions instead of using independent parameters.

13. The one or more non-transitory computer-readable media of claim 9, wherein the neural network in which the bidirectional language model is implemented is a long short-term memory (LSTM) neural network.

14. The one or more non-transitory computer-readable media of claim 9, wherein the formed expression further comprises one or more factors that are determined by the neural network used for the natural language understanding (NLU) or natural language processing (NLP) task.

15. The one or more non-transitory computer-readable media of claim 9, wherein inserting the formed expression into a layer of the neural network used for the natural language understanding (NLU) or natural language processing (NLP) task further comprises concatenating the formed expression a token representation in the neural network used for the natural language understanding (NLU) or natural language processing (NLP) task.

16. A system for improving the performance of a neural network used for a natural language understanding (NLU) or a natural language processing (NLP) task, comprising:
   an electronic processor;
   a non-transitory data storage element coupled to the processor and including a set of computer-executable instructions that, when executed by the electronic processor, cause the system to
   represent a natural language sequence or sequences as a bidirectional language model;
   implement the bidirectional language model in the form of a neural network;
   train the neural network in which the language model is implemented using a corpus of text;
   identify representations of the bidirectional language model in one or more layers of the trained neural network; and
   form an expression based on the identified representations, wherein the formed expression further comprises one or more factors that are determined by the neural network used for the natural language understanding (NLU) or natural language processing (NLP) task.

17. The system of claim 16, wherein the bidirectional language model includes a forward and a backward language model, with the formulation of the language model jointly maximizing the log likelihood of the forward and backward directions.

18. The system of claim 16, wherein the natural language of understanding (NLU) or natural language processing (NLP) task is one of textual entailment, question answering, semantic role labeling, co-reference resolution, named entity extraction, or sentiment analysis.

19. The system of claim 16, further comprising computer-executable instructions that cause the electronic processor or a second electronic processor to insert the formed expression into a layer of the neural network used for the natural language understanding (NLU) or natural language processing (NLP) task.

20. The system of claim 19, wherein inserting the formed expression into a layer of the neural network used for the natural language understanding (NLU) or natural language processing (NLP) task further comprises concatenating the formed expression with a token representation in the neural network used for the natural language understanding (NLU) or natural language processing (NLP) task.

* * * * *